Feb. 11, 1936. W. E. WATTS ET AL 2,030,338
STROPPER
Filed Nov. 11, 1933 4 Sheets-Sheet 1

Inventors
William E. Watts,
J. W. Lowry,
By Clarence A. O'Brien
Attorney

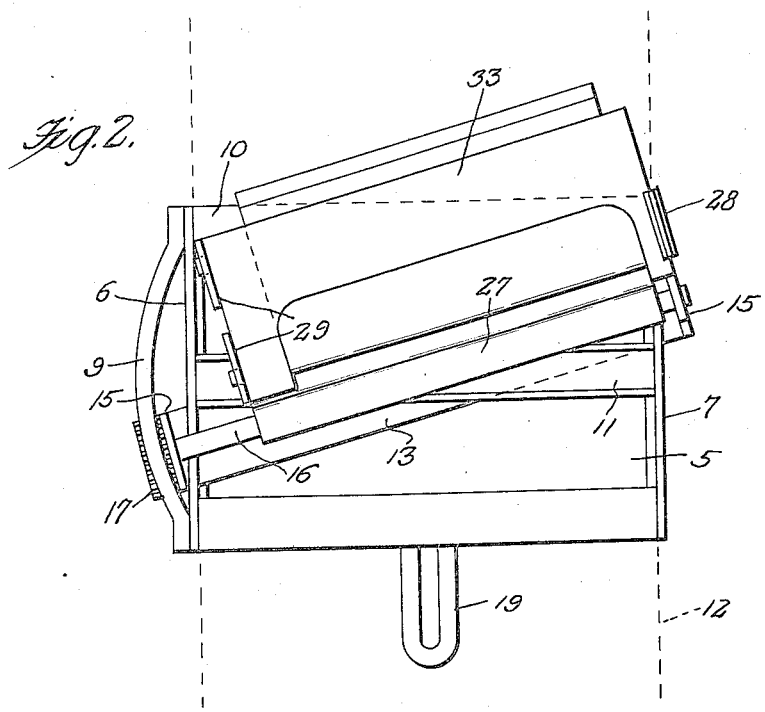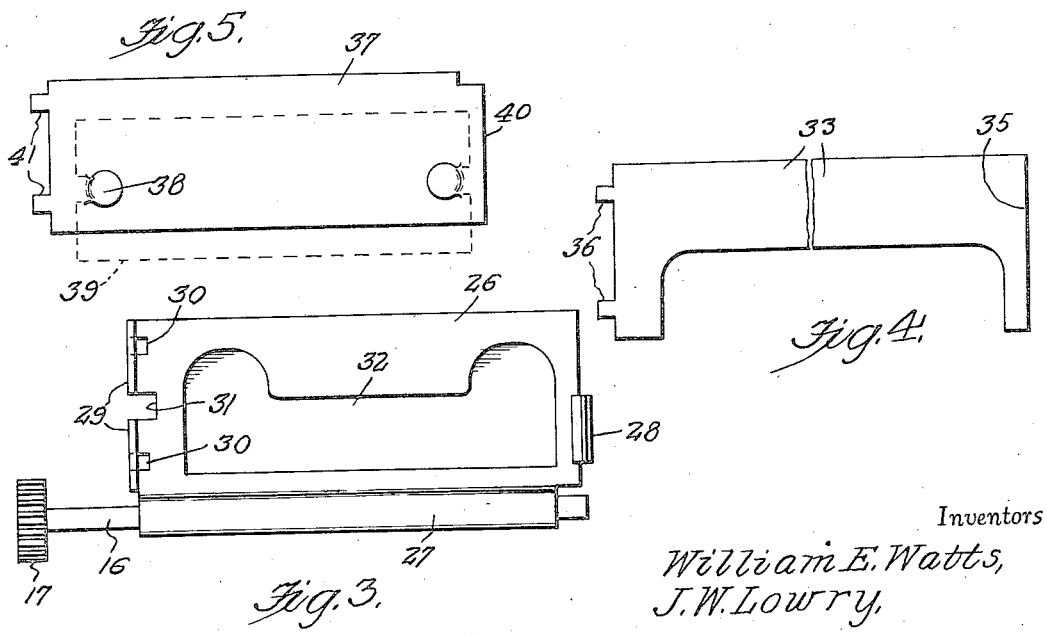

Feb. 11, 1936.  W. E. WATTS ET AL  2,030,338
STROPPER
Filed Nov. 11, 1933  4 Sheets-Sheet 3

Inventors
William E. Watts,
J. W. Lowry,

By Clarence A. O'Brien
Attorney

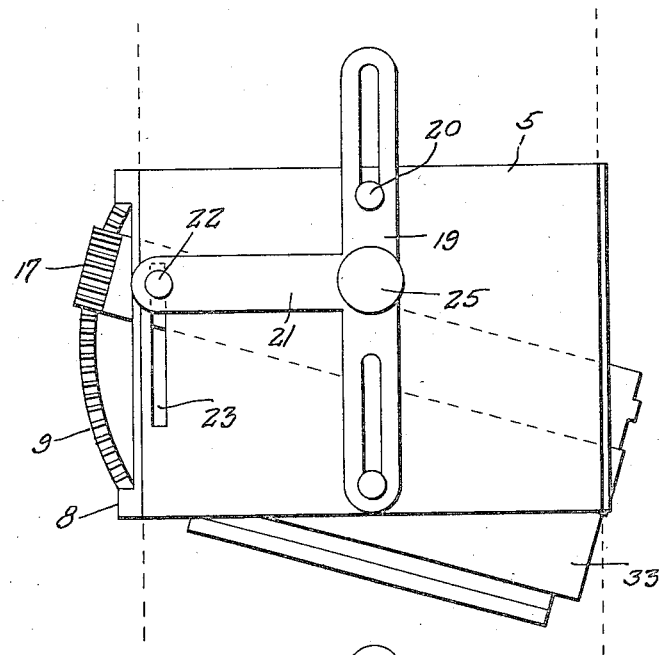
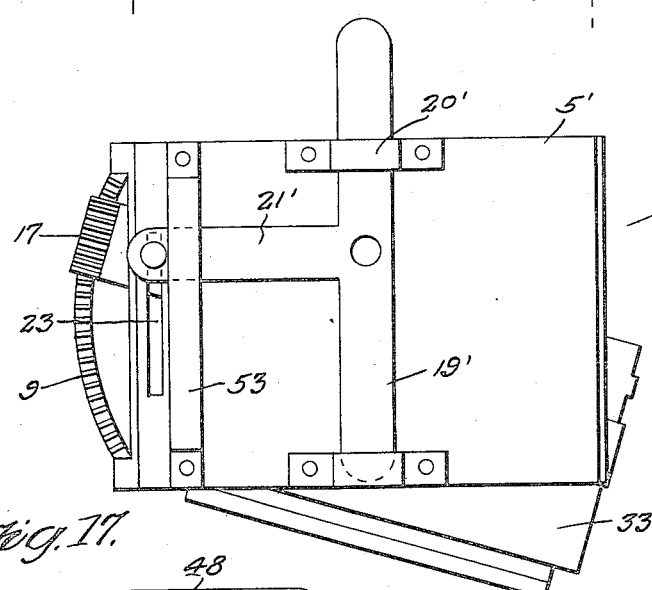
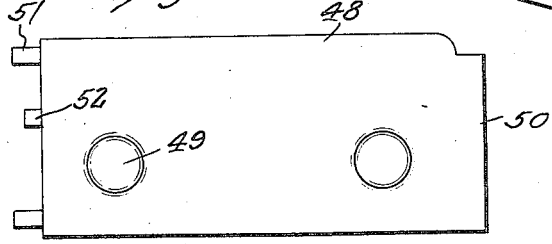

Patented Feb. 11, 1936

2,030,338

UNITED STATES PATENT OFFICE 2,030,338

STROPPER

William E. Watts and Jesse W. Lowry, McCammon, Idaho

Application November 11, 1933, Serial No. 697,650

1 Claim. (Cl. 51—153)

This invention relates to a stropper or automatic safety razor blade sharpener and has as its object the provision of a device of this character which will accommodate blades of various types.

A still further object of the invention is to provide a device of this character whereby the blade to be sharpened will be held in contact with the strap at an angle other than perpendicular to the sides of the strap so that a better cutting edge is possible.

A still further object of the invention is to provide a stropper which is of simple construction and operation and which may be retailed for a nominal price.

The invention together with its objects and advantages will be best understood from a study of the following description taken in connection with the accompanying drawings wherein:

Figure 2 is a top plan view thereof.

Figure 3 is an elevational view of one form of blade holder.

Figure 4 is an elevational view of a clamp element forming part of the holder shown in Figure 3.

Figure 5 is an elevational view of a slightly modified form of clamp plate.

Figure 15 is a bottom plan view of the stropper.

Figure 16 is a view similar to Figure 15 of a slightly modified form of stropper, and Figure 17 is an elevational view of still another form of clamp plate.

Figure 1:
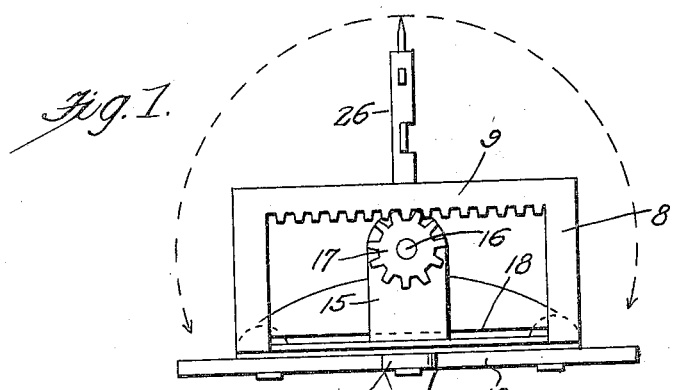
Figure 1 is a side elevational view of the stropper.

Referring to the drawings by reference numerals it will be seen that the stropper comprises what may be termed a base frame, the same comprising a bottom plate 5 having upstanding end or flange portions 6 and 7 respectively. At the end 6 thereof the frame is provided with an inverted U-shaped structure 8 the upper member of which at its under side edge is suitably formed to provide a rack bar 9.

At opposite side edges thereof the base plate 5 on its top face is provided with transverse ribs 10, and inwardly from said edges a transverse guide bar 11 is supported between the sides 6 and 7 of the base frame. The strop 12 is trained over the base plate 5 passing over the ribs 10 and beneath the guide bar 11 as clearly shown in Figure 12.

A bar 13 has a pivot hole intermediate its ends as at 14, for receiving a pivot pin which pivots the bar to the plate 5, and said bar is provided at the ends thereof with upstanding apertured lugs 15. A shaft 16 has the ends thereof journalled in the lugs 15, and on one end thereof the shaft is provided with a gear wheel 17 that is in mesh with the rack bar 9 as shown clearly in Figures 1 and 15. The lug equipped ends of the bar 13 operate in suitable slots 18 provided therefore in the sides 6, 7 of the base frame 5.

For oscillating the bar 13 there is provided on the underside of the plate 5 a T-shaped member the head portion 19 of which is provided in the end thereof with slots in which operate headed studs 20 provided on the under side of the plate 5 for guiding said T-shaped member. The stem 21 of said member is provided with a pin 22 on its free end that operates in a slot 23 provided in the plate 5, and also in a slot 24 provided adjacent one end of the bar 13. To reciprocate the T-shaped member there is provided a suitable handle 25.

Secured to the shaft 16 and swingable therewith as indicated by broken lines in Figure 1 is a blade holder which includes a relatively fixed clamp plate 26 formed at one end with a sleeve 27 that is rigidly secured to the shaft 16. At one end edge thereof the plate 26 is provided with a spring clip 28, while at a relatively opposite end thereof said plate 26 is provided with upper and lower flanged portions 29 provided with apertures 30, and a notch 31 between the portions 29. Also on one face thereof the plate 26 is suitably recessed or otherwise formed as at 32 to accommodate the thickened edge portion of a Gem razor blade.

Figure 8:
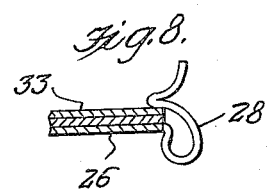
Figure 8 is a fragmentary detail sectional view through a holder showing the means for holding one end of the clamp plate engaged with its complemental part of the holder.
Figure 7:
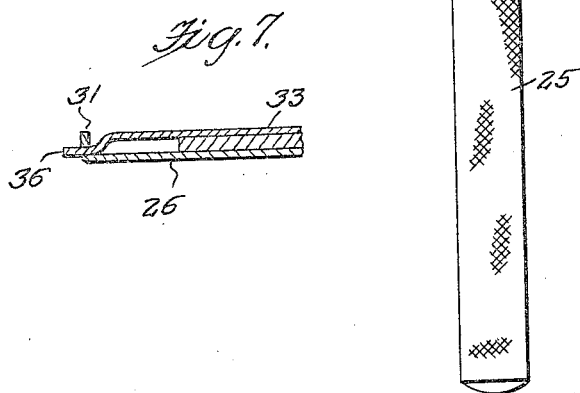
Figure 7 is a fragmentary detail sectional view through one form of holder showing the manner of securing the blade therein.
Figure 9:
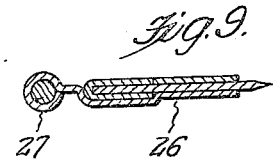
Figure 9 is a transverse sectional view through one form of holder with the blade clamped therein.

When a Gem razor blade is to be sharpened a complemental clamp plate of the type shown in Figure 4 and indicated generally by the reference numeral 33 is used. The plate 33 is of the shape and form shown in Figure 4 and has one end edge 35 suitably provided to be engaged by the clip 28 in a manner suggested in Figure 8, and a second end edge thereof provided with ears or projections 36 to engage the apertures 30 in a manner suggested in Figure 7.

Also when a Gem type of blade is to be sharpened there may be used in lieu of the plate 33 the complemental clamp plate shown in Figure 5 and indicated by the reference numeral 37. The plate 37 adjacent one longitudinal edge thereof has retaining clips 38 pressed out therefrom to engage positively the end edges of the blade 39 indicated by dotted line in Figure 5. This plate 37 is also adapted to have the end edge 40 thereof engaged by the clip 28, and at the opposite end edge is provided with projections 41 adapted to engage the apertures 30 of plate 26.

Figure 10:
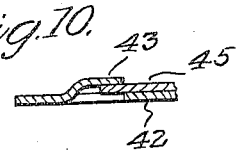
Figure 10 is a fragmentary detail sectional view taken substantially on the line 10—10 of Figure 6.
Figure 6:
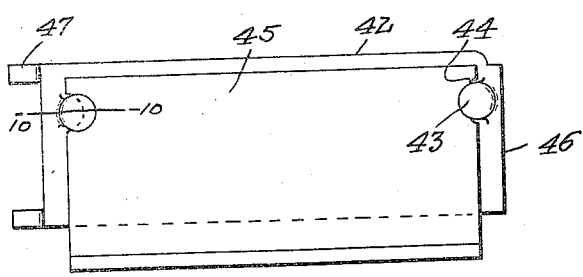
Figure 6 is an elevational view of still another form of clamp plate.
Figure 11:
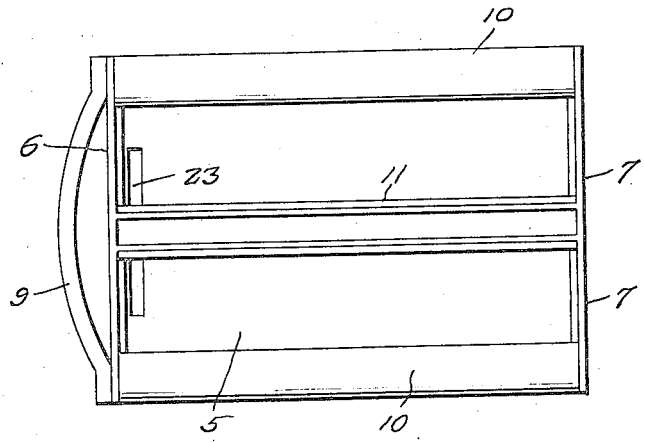
Figure 11 is a top plan view of the base frame.

For accommodating what is known as an "Auto-Strop" type of blade there is provided, complemental to the plate 26 a clamping plate of the type shown in Figure 6 and indicated by the reference numeral 42. The plate 42 is somewhat on the order of plate 37 being provided with blade engaging clips 43 pressed out therefrom to engage in the notch portions 44 of the Auto-Strop blade 45 in a manner suggested in Figure 10. The plate 42 also has an edge 46 adapted to be engaged with the spring clip 28 on the plate 26, and fingers or extensions 47 adapted to engage in the apertures 30 of the parts 29 of plate 26.

In Figure 17 is shown a complemental clamp plate indicated by the reference numeral 48 and which is especially adapted for use in connection with the Gillette type of razor blade, the latter, as is well known, being provided adjacent its end edges with suitable notches. To engage these notched edge portions of this type of blade plate 48 has pressed out from one side thereof protuberances 49. Plate 48 also has an end edge 50 which is adapted to be engaged by the spring clip 28, and at its other edge projections 51 to engage the apertures 30 of the plate 26, as well as a third projection 51 to engage the notch 31 of the plate 26.

From the above detailed description it will be apparent that in stropping a blade, a blade of a particular type is placed on the plate 26 of the holder, and the proper complemental clamping plate employed to secure the blade in position on the holder. The stropper is steadied by one hand of the operator, and with the other hand the operator grasping the handle 25 exerts alternately a push and pull on said handle for reciprocating the bar 19. As the bar 19 is thus reciprocated motion of said bar is transmitted through the pin and slot connection between the arm 21 of said bar and the plate 13 for causing the latter to swing in the arc of a circle first in one direction and then in the opposite direction as will be clear from a study of Figures 2 and 15. As the bar 13 is thus moved rotary motion is transmitted to the shaft 16 through the medium of the rack 9 and pinion 17 engaged therewith to thereby swing the blade holder first in one direction then in a relatively opposite direction for presenting one side of the cutting edge of the plate to the strop 12 and then the other side of said blade at the cutting edge thereof to the strop for sharpening purposes.

It will thus be seen that during the operation of the stropper the blade is brought into engagement with the strap 12 with the edge of the blade extending diagonally across the strap 12 with the result that a very keen edge for the blade will be obtained.

In the form of the invention shown in Figure 16 instead of employing the pin and slot connection between the plate 5 and the bar 19 for guide purposes the bar 19' in said figure has the ends thereof operating in suitable guides 20' secured to the under side of the plate 5' adjacent opposite edges thereof. Also, in this form of the invention there is provided a suitable guide 53 for the stem 21' of the T-shaped member, the guide 53 being in the nature of a strap secured at its ends to the under side of the plate 5' as shown.

Figure 12:
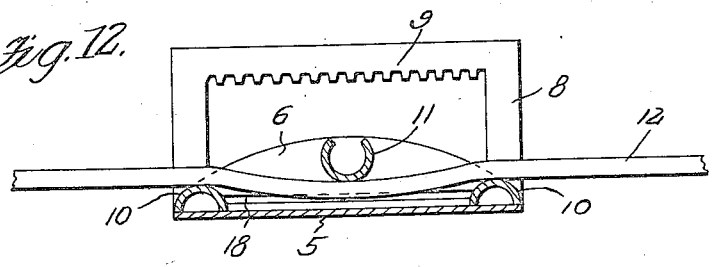
Figure 12 is a transverse sectional view through the base frame showing the stropper in operative position.
Figure 13:
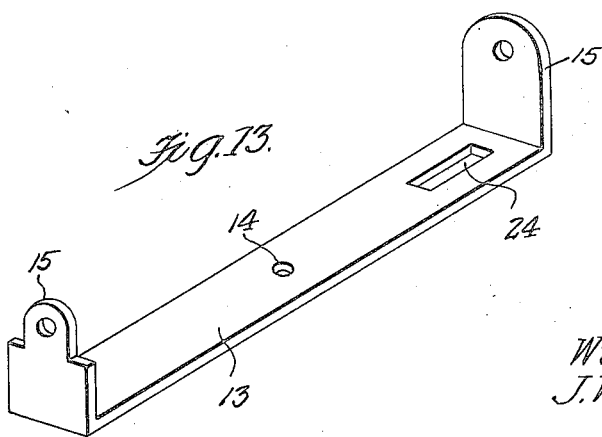
Figure 13 is a perspective view of a shaft holding bar.
Figure 14:
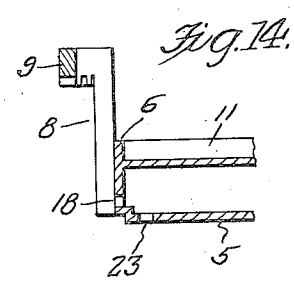
Figure 14 is a fragmentary sectional view through the frame at one side of the latter.

In both forms of the invention, an ordinary strop can be used, with one end of the strop attached to a hook or the like on a stationary support, with the strop passing through the device, as shown in Figure 12, with the opposite end of the strop held by the hand of the user and the other hand grasping the handle 25. At the end of one stroke of the device over the strop, the parts will be in the position shown in Figure 15 and then as the handle 25 moves in an opposite direction for the next stroke, the bar 19 slides on the base 5 until the studs 20 engage the opposite ends of the slots and this movement of the bar 19 will cause the pin 22 to shift the bar 13 to its other tilting position and this movement of the bar 13 will cause the pinion 17 to move over the rack 9 so that the shaft 16 is rocked to swing the blade holder to place the other beveled edge of the blade against the strop and then further movement of the handle 25 will cause the entire device to slide over the strop so as to bring said edge of the blade along the strop. Thus the single handle 25 is used to change the position of the blade holder and to move the device along the strop. However, when desired, the blade holder can be swung from one position to another by simply grasping the base with one hand and moving the handle and the bar 19 with the other.

Having thus described our invention, what is claimed as new is:

A stropper of the class described comprising a base having flanges at its ends and rounded ribs adjacent its side edges, a bar having its ends connected with the flanges and extending across the middle portion of the base and paralleling the ribs, a strop passing over the ribs and under the bar, an inverted U-shaped member connected to one end of the base and having an outwardly bowed bight, the under edge of which is toothed, a carrier bar having its central portion pivoted to the upper face of the base, the flanges having slots therein through which the ends of the carrier bar pass, the ends of said carrier bar being upturned, a shaft having its ends journaled in said upturned ends, a pinion attached to one end of the shaft and meshing with the teeth of the U-shaped member, a T-shaped bar slidably supported on the under face of the base, the stem of said T-shaped bar being connected with the carrier bar, whereby sliding movement of the T-shaped bar will impart a rocking movement to the carrier bar, and a handle depending from the T-shaped bar, and a blade carrier having one edge connected with the shaft.

WILLIAM E. WATTS.
JESSE W. LOWRY.